United States Patent
Doering et al.

(10) Patent No.: US 9,796,832 B2
(45) Date of Patent: Oct. 24, 2017

(54) FLUOROPOLYMER COMPOSITIONS WITH MICROSPHERES

(71) Applicant: 3M INNOVATIVE PROPERTIES COMPANY, St. Paul, MN (US)

(72) Inventors: Marcel Doering, Neuss (DE); Robert Veenendaal, Klimmen (NL)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/768,072

(22) PCT Filed: Feb. 10, 2014

(86) PCT No.: PCT/US2014/015572
§ 371 (c)(1),
(2) Date: Aug. 14, 2015

(87) PCT Pub. No.: WO2014/126850
PCT Pub. Date: Aug. 21, 2014

(65) Prior Publication Data
US 2015/0368437 A1    Dec. 24, 2015

(30) Foreign Application Priority Data
Feb. 14, 2013    (EP) .................................... 13155274

(51) Int. Cl.
C08K 7/18 (2006.01)
F16J 9/26 (2006.01)
F16J 15/16 (2006.01)

(52) U.S. Cl.
CPC  *C08K 7/18* (2013.01); *F16J 9/26* (2013.01); *F16J 15/16* (2013.01)

(58) Field of Classification Search
CPC .................................... C08K 7/18; C08K 7/24
USPC .......................... 523/218, 219, 223; 524/492
See application file for complete search history.

(56) References Cited

U.S. PATENT DOCUMENTS

| | | | |
|---|---|---|---|
| 4,563,488 A * | 1/1986 | Minami | .................... C08K 3/22 264/175 |
| 4,812,367 A | 3/1989 | Bickle et al. | |
| 5,250,269 A | 10/1993 | Langer | |
| 5,536,569 A * | 7/1996 | Lasch | ..................... E01F 9/512 359/540 |
| 2007/0015937 A1 | 1/2007 | Hintzer | |

FOREIGN PATENT DOCUMENTS

| | | |
|---|---|---|
| CN | 101386701 A | 3/2009 |
| EP | 0442363 | 8/1991 |
| WO | WO 99-46028 | 9/1999 |
| WO | WO 2006-071599 | 7/2006 |
| WO | WO 2013-112518 | 8/2013 |

OTHER PUBLICATIONS

CRC Handbook of Chemistry and Physics, $63^{rd}$ Edition, p. F-65 (1982).*
International Search report for PCT International Application No. PCT/US2014/015572 mailed on Mar. 18, 2014, 3 pages.

* cited by examiner

*Primary Examiner* — Edward Cain
(74) *Attorney, Agent, or Firm* — C. Michael Geise

(57) ABSTRACT

Fluoropolymer compositions are described which comprise tetrafluoroethene polymers and substantially spherical particles. Further provided are methods of making such compositions and articles prepared from such compositions. The compositions can be used to increase the wear resistance and/or the electrical insulation properties of an article.

10 Claims, No Drawings

FLUOROPOLYMER COMPOSITIONS WITH MICROSPHERES

CROSS REFERENCE TO RELATED APPLICATIONS

This application is a national stage filing under 35 U.S.C. 371 of PCT/US2014/015572, filed Feb. 10, 2014, which claims priority to European Application No. 13155274.7, filed Feb. 14, 2013, the disclosure of which is incorporated by reference in its/their entirety herein.

FIELD

The present disclosure relates to fluoropolymer compositions comprising inorganic fillers, articles containing them and methods of making them. The fluoropolymers include tetrafluoroethene homo- or copolymers. The inorganic fillers include inorganic particles, in particular microspheres, of high density.

BACKGROUND

Fluoropolymers have found wide commercial application due to their chemical inertness, low friction and non-stick properties. Their high melting points allow for high service temperatures. These properties have made fluoropolymers the material of choice for making sealing materials for demanding applications in the automotive, aircraft, chemical and electronic industry. Typical fluoropolymers, their preparation and application are described, for example, in Modern Fluoropolymers, John Scheirs (editor), John Wiley & Sons Ltd, 1997.

When using fluoropolymers as seals the life time of the seals may get reduced by wear, for example, due to frictional forces. There is a continuous need to further improve the properties of sealing materials containing fluoropolymers, in particular in providing fluoropolymer compositions having improved resistance to wear.

SUMMARY

Therefore, in the following there is provided, in one aspect, a composition comprising
(i) tetrafluoroethene polymer selected from tetrafluoroethene homopolymers and tetrafluoroethene copolymers containing up to about 20% by weight of comonomers other than tetrafluoroethene;
(ii) microspheres having a density of from about 1.2 to about 3.0 g/cm$^3$ and comprising inorganic oxides selected from aluminium oxides, silicon oxides and combinations thereof.

In another aspect there is provided a shaped article comprising the composition described herein.

In yet another aspect there is provided a method of making a composition as described herein.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items. For example, a composition containing an ingredient A is meant to contain A or A and other ingredient. A composition consisting of A is meant to have ingredient A but no other ingredient. In both cases (limiting or non limiting meaning) equivalents are meant to be included.

The use of "a" or "an" is meant to encompass "one or more".

Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

Due to their resistance to chemical and high thermal service temperatures fluoropolymers are frequently used as gaskets and sealing materials in demanding applications, for example in the aircraft, motorcraft and oil and gas processing industry and in chemical engineering. In particular in applications where the fluoropolymer-containing material is subjected to frictional forces, good resistance against wear is required to increase the life-time of the material. Glass fibers can be added as reinforcing materials to increase the resistance of fluoropolymers. It has now been found that fluoropolymer compositions containing the microspheres as described herein show an improved resistance to wear. They also show low deformation and good mechanical properties which allow the creation of shaped articles. The good mechanical properties can be achieved by the microspheres as described herein without requiring additional reinforcing materials, like for example fibers. The addition of the microspheres described herein also leads to a more homogeneous compound. This allows for an easier processing and shaping of the compounds. The material also has good inertness to hydrocarbon liquids or fumes.

Fluoropolymers

The fluoropolymers provided herein are homo- or copolymers of tetrafluoroethene (TFE). The tetrafluoroethene copolymers typically contain predominantly repeating units derived from tetrafluoroethene (typically 80% or more than 80% by weight of the polymer is derived tetrafluoroethene). In some embodiments the tetrafluoroethene copolymers contain up to about 20% by weight of comonomers. In other embodiments the tetrafluoroethene copolymers contain up to about 10% by weight of comonomers. Tetrafluoroethene (TFE) homopolymers and TFE copolymers with up to 1% by weight of other fluorinated monomers are referred to in the art as polytetrafluoroethene (PTFE).

The TFE copolymers may be partially fluorinated or perfluorinated. Partially fluorinated copolymer contain one or more non-fluorinated or partially fluorinated comonomer, wherein a partially fluorinated comonomer contains fluorine atoms and one or more hydrogen atoms. Suitable non fluorinated comonomers include, for example, propene and ethane. Suitable partially fluorinated comonomers include, for example, but not limited to, vinylidene fluoride or vinyl fluoride. Perfluorinated copolymers contain only units derived from comonomers other than TFE that are derived from perfluorinated comonomers. Perfluorinated co-monomers do not have hydrogen atoms, but contain only carbon atoms and fluorine atoms but may further include oxygen and chlorine atoms. Suitable perfluorinated comonomers include perfluorinated alpha-olefins (general formula $C_nF_{2n}$ with n being an integer of 2 to 10). A specific example is hexafluoropropylene (HFP). Other perfluorinated monomers include perfluorinated alkyl or allyl ethers (general formula $CF_2=CF-(CF_2)_n-O-Rf$, wherein n represents either 0 or 1 and Rf represents a linear or branched, cyclic or acyclic perfluorinated alkyl residue containing no, one or more than one catenary oxygen atom. Rf may contain up to 8, preferably, or up to 6 carbon atoms, such as 1, 2, 3, 4, 5 and 6 carbon atoms. Specific examples include but are not limited to perfluoroalkyl ethers (PAVE), like perfluoromethylether (PMVE) or perfluoropropylvinylether (PPVE). Other suitable examples include chlorotrifluoroethene (CTFE) and dichlorodifluoroethene.

In preferred embodiments the fluoropolymers are crystalline or substantially crystalline to have a melting point of at least 230° C. or melting range including a temperature of at least 230° C. In a preferred embodiment the fluoropolymers provided herein have a melting point of from about 317° C.+/−20° C., more preferably from about 327° C.+/−10° C. or melt within a range covering these temperatures.

The fluoropolymers or at least the fluoropolymer compositions described herein have the mechanical properties sufficient to prepare shaped articles. In some embodiments of the present disclosure the fluoropolymers (or at least the fluoropolymer compositions) have a tensile strength of at least about 10 MPa, preferably at least about 20 MPa. Additionally they may have typically an elongation at break of at least 20%, preferably at least 100% and more preferably at least 200%.

The fluoropolymers may be melt-processable or not melt-processable. The property of being "melt-processable" or not is generally determined by the melt flow index (MFI). The MFI measures the amount of polymer that can be pushed through a die at a specified temperature (here 372° C.) using a specified weight (here 5 kg). Thus, the MFI is a measure for the suitability for melt-processing a polymer. Non melt processable fluoropolymers have an MFI (372/5) of less than 0.1 g/10 min. Melt processable fluoropolymers have an MFI (372/5) or more than 0.1 g/10 min.

In an embodiment of the present disclosure the fluoropolymer is PTFE. PTFE typically has a very high molecular weight, typically about $10^6$ g/mole or greater. This high molecular weight leads to a very high melt viscosity (about $10^{10}$-$10^{13}$ Pa·s at 380° C.) making PTFE unavailable for ordinary melt processing like melt extrusion. PTFE is therefore regarded "non melt-processable". PTFE has an MFI (372/5) of less than 0.1 g/10 min. Since PTFE cannot be processed from the melt by ordinary melt-processing techniques like melt extrusion or injection molding, special processing techniques have to be used to make shaped PTFE articles. Such techniques include ram extrusion and compression molding typically followed by sintering to further fuse the particles. Typically, the PTFE particles obtained by the polymerisation are processed by these techniques to prepare blocks ("billets"), which are then sintered to further fuse the polymer particles. The sintered billets are then skived or machined into shaped articles. This somewhat cumbersome processing is offset by the good chemical and thermal resistance of the non-melt processable PTFE.

The fluoropolymer compositions provided herein may contain one or more fluoropolymers, for example a blend of different fluoropolymers, The fluoropolymer may differ by their chemical compositions, or not by their chemical composition but by their molecular weight or degree of polymerisation or polymer structure, for example as is the case in bimodal or multimodal compositions.

In some embodiments the fluoropolymer compositions provided herein are solid compositions. Such intimate solid mixtures of fluoropolymers and additives are referred to in the art as "compounds". Typically, "compounds" may be shaped, for example, in the form of particles (like granules or pellets) or in the form of sheets. The granules or sheets may have a dimension, like a length or a diameter, of at least 500 μm or at least 5,000 μm.

The fluoropolymers may be typically obtained by radical polymerisation initiated by a free radical initiator. The polymerisation may be carried out in an aqueous phase. The polymerisation may be carried out as emulsion polymerisation or as suspension polymerisation.

Suspension polymerisations generally are carried out in an aqueous phase and in the absence of emulsifiers. In a suspension polymerisation the reaction mixture typically coagulates and settles as soon as stirring of the reaction mixture is discontinued. The resulting polymer particles are generally of bigger size than those obtained by emulsion polymerisation. Typically, the polymer particles obtained by emulsion polymerisations have a particle size in the range of 50 to 500 nm while polymer particles with particle sizes of greater than about 600 nm and up to about 800 μm may be obtained by suspension polymerisation. Since no emulsifiers are used suspension fluoropolymers are also free of fluorinated emulsifiers, for example free of the fluorinated emulsifiers described below.

In aqueous emulsion polymerisation the polymerisation is carried out in a way that stable dispersions of small particles are obtained. The dispersions remain stable (no phase separation) after stirring of the reaction mixture has stopped for at least 2 hours, or at least 12 hours or at least 24 hours. Typically, fluorinated emulsifiers are employed in the aqueous emulsion polymerisation. The emulsifiers stabilise the small polymer particles in the reaction mixture to generate a dispersion. The fluorinated emulsifiers are typically used in an amount of 0.01% by weight to 1% by weight based on solids (polymer content) to be achieved. Suitable emulsifiers include any fluorinated emulsifier commonly employed in aqueous emulsion polymerization. Typical emulsifiers correspond to the general formula:

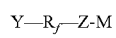

$$Y-R_f-Z-M$$

wherein Y represents hydrogen, Cl or F; $R_f$ represents a linear or branched perfluorinated or partially fluorinated alkylene having 4 to 16 carbon atoms; Z represents COO− or $SO_3^-$ and M represents a cation like an alkali metal ion, an ammonium ion or H. The alkylene unit may be a polyether alkylene unit, i.e. it may contain one or more catenary oxygen atoms (ether oxygen atoms). Exemplary emulsifiers include: ammonium salts of perfluorinated alkanoic acids, such as perfluorooctanoic acid and perfluorooctane sulphonic acid.

More recently emulsifiers of the general formula [$R_f$—O-L-COO−]$_i$X$_i^+$ have been used wherein L represents a linear or branched partially or fully fluorinated alkylene group or an aliphatic hydrocarbon group, $R_f$ represents a linear or branched, partially or fully fluorinated aliphatic group or a linear or branched partially or fully fluorinated group interrupted with one or more oxygen atoms, X$_i^+$ represents a cation having the valence i and i is 1, 2 and 3. In case the emulsifier contains a partially fluorinated aliphatic group, it is referred to as a partially fluorinated emulsifier. Preferably, the molecular weight of the emulsifier is less than 1,000 g/mole. Specific examples are described in, for example, US Pat. Publ. 2007/0015937 (Hintzer et al.), incorporated herein by reference.

Fluoropolymers are commercially available from various supplies, for example DuPont de Nemours & Company, 3M Company, Daikin Industries and Solvay Solexis S.p.a. Examples of commercially available PTFE grades, for example granular-grade PTFE, include trade designated DYNEON TF 1620 PTFE, DYNEON TF 1641 PTFE, DYNEON TF 1645 PTFE, DYNEON TF 1750 PTFE, DYNEON TFM 1600 PTFE, DYNEON TFM 1700 PTFE, DYNEON TFM 1705 PTFE, and DYNEON TFR 1502 PTFE, all of which are available from 3M Company, St. Paul, Minn., Inorganic Microspheres:

Microspheres useful in the composition according to the present disclosure contain inorganic materials. They typically contain inorganic oxides selected from silicon oxides, boron oxides and aluminium oxides and combinations thereof. Examples include but are not limited to aluminosilicates and aluminoborosilicates and combinations thereof, like for example present in glass and ceramics. The inorganic oxides may contain further oxides, although typically in lesser amounts than silicon oxides, boron oxides or aluminium oxides. Such other oxides include but are not limited to sodium oxides, potassium oxides, zirconium oxides, iron oxides and combinations thereof. In one embodiment of the present disclosure, the microspheres contain at least 50% by weight or at least 75% by weight based on the weight of the microspheres of inorganic oxides selected from silicon oxides, boron oxides or aluminium oxides or combinations thereof.

The microspheres may be amorphous and non-crystalline (glass microspheres) or ceramic. In preferred embodiments the microspheres are ceramic microspheres. Ceramic microspheres are typically contain crystalline materials.

The microspheres are of high density and have a density, for example, of from about 1.5 up to about 3 g/cm$^3$. Preferred embodiments according to the present disclosure have a density of from about 2.0 to 2.8 g/cm$^3$, or from about 2.2 to about 2.6 g/cm$^3$. The density can be determined (according to ASTM D-2840-69) by weighing a sample of the particles and determining the volume of the sample with an air comparison pycnometer (such as a ACCUPYC 1330 Pycnomether or a Beckman Model 930). To have such a high density, the particles are typically solid particles, i.e. they are not hollow. In preferred embodiments of the present disclosure the microspheres have a bulk density of from about 1.2 to about 2.2 g/cm$^3$, preferably from about 1.4 to 1.8 g/cm$^3$. The bulk density can be determined by weighing the amount of microspheres that fill a volume of 100 ml in a measuring cylinder. The microspheres are of substantially spherical shape. The microspheres typically have a diameter in the range from 0.5 µm up to 50 µm. The microspheres may be present as a plurality of microspheres of different diameters. In preferred embodiments, the majority of the microspheres have a diameter between 0.5 to 50 µm or more preferably 1 to 20 µm. In typical embodiments of the present disclosure the microspheres have a volume average particle size (diameter) of from about 0.5 to about 50 µm, preferably from about 0.8 to about 20 µm and more preferably from about 1 to about 12 µm. The microspheres preferably have a crush strength in excess of the anticipated pressures that may rise during manufacturing of articles. Examples of suitable average crush strengths for the inorganic particles include at least about 40.000 psi. The average crush strengths can be measured, for example, according to ASTM D3102-72, with the exception that the sample size of the particles is 10 milliliters, the particles are dispersed in 20.6 grams of glycerol, and the data reduction is automated using computer software. The value reported is the hydrostatic pressure at which 10% by volume of the particles collapse (i.e., 90% survival).

Examples of particularly suitable inorganic particles include ceramic microspheres, for example ceramic microspheres commercially available from 3M Corporation, St. Paul, Minn., USA, under the trade designations W 210, W410 or W610.

The inorganic microspheres may be used in the fluoropolymer compositions according to the present disclosure in amounts of up to about 35 wt. %, or up to about 20 wt. % (based on the total weight of the composition). Typical amounts include from about 1 wt. % up to about 15 wt. %, like from about 1.5 wt. % to about 10.5 wt. % based on the total weight of the composition.

Additives

The compositions may contain additional additives. Additives may include fibers. Fibers may be organic or inorganic fibers. Fibers typically have a length that is at least 5 times greater than their diameter. Preferably, the fibers contain inorganic material (inorganic fibers). Typical inorganic material includes alumina (aluminium oxides), silica (silicon oxides), silicon nitrides, silicon carbide and combinations thereof. Another example of inorganic fibers are carbon fibers. These inorganic materials may be used singly, or at least two of them may be mixed and used in combination. For example, the inorganic fiber material may comprise alumina alone, or another inorganic material may further be used in combination with alumina, such as silica. Such fibers are referred to as alumina-silica fibers. Fibers containing a combination of silica, alumina and boron are referred to as aluminoborosilicate fibers. The fiber materials may contain further metals such as sodium, potassium, calcium, magnesium, boron, titanium and zirconium and in particular their oxides.

Typically, inorganic fibers include ceramic fibers, glass fibers, and polycrystalline inorganic fibers.

The inorganic fibers may be used either individually or in combination of two or more kinds.

Specific examples of particular inorganic fibers include but are not limited to high alumina fibers comprising aluminum oxide in the range from about 67 to about 98 percent by weight and silicon oxide in the range from about 33 to about 2 percent by weight. These fibers are commercially available, for example, under the trade designation "NEXTEL 550" from the 3M Company, "SAFFIL" available from Dyson Group PLC, Sheffield, UK, "MAFTEC" available from Mitsubishi Chemical Corp., Tokyo, Japan) "FIBERMAX" from Unifrax, Niagara Falls, N.Y., and "ALTRA" from Rath GmbH, Germany. Further suitable inorganic fibers include but are not limited to aluminoboro silicate fibers, for example comprising aluminum oxide in the range from about 55 to about 75 percent by weight, silicon oxide in the range from less than about 45 to greater than zero (preferably, less than 44 to greater than zero) percent by weight, and boron oxide in the range from less than 25 to greater than zero (preferably, about 1 to about 5) percent by weight (calculated on a theoretical oxide basis as $Al_2O_3$, $SiO_2$, and $B_2O_3$, respectively). Aluminoborosilicate fibers are commercially available, for example, under the trade designations "NEXTEL 312" and "NEXTEL 440" from the 3M Company.

The fibers may typically have a diameter between 1 and 26 micrometers, preferably greater than 5 µm. Typically, the fibers have a length that is at least five times greater than their diameter. In a preferred embodiment, the fibers have a diameter of from about 6 to 18 micrometers, more preferably the fibers have an average diameter of about 8 to 16 micrometers. Preferably, the fibers are free or essentially free of fibers having a diameter of less than 3 micrometers.

Essentially free here means that the amount of such small diameter fibers is not more than 2% by weight, preferably not more than 1% by weight of the total weight of fibers in the ceramic fiber layer.

The fibers may be crystalline or polycrystalline fibers. The fibers may be heat treated fibers sometimes called annealed fibers. Annealed fibers may be obtained as disclosed in U.S. Pat. No. 5,250,269 (Langer) or WO 99/46028, published Sep. 16, 1999.

In another particular embodiment, the fibers used include magnesium aluminium silicate fibers. For example fibers having between 10% and 30% by weight of aluminium oxide, between 52 and 70% by weight of silicium oxide and between 1% and 12% of magnesium oxide. The weight percentages of the aforementioned oxides are based on the theoretical amount of $Al_2O_3$, $SiO_2$ and MgO. The magnesium aluminium silicate glass fiber may contain additional oxides. For example, additional oxides that may be present include sodium or potassium oxides, boron oxide and calcium oxide. Particular examples of magnesium aluminium silicate glass fibers include but are not limited to E-glass fibers which typically have a composition of about 54 wt % $SiO_2$, 14 wt % $Al_2O_3$, 10 wt % of $B_2O_3$, 19 wt % CaO, 3 wt % MgO and 1 wt % other oxides (such as $Na_2O$ and $K_2O$). Further useful examples include but are not limited to S and S-2 glass fibers which typically have a composition of about 65 wt % of $SiO_2$, 25 wt % of $Al_2O_3$ and 10 wt % of MgO and R-glass fibers which typically have a composition of 60 wt % of $SiO_2$, 25 wt % of $Al_2O_3$, 9 wt % of CaO and 6 wt % of MgO. E-glass, S-glass and S-2 glass are available, for example, from Owens Corning and/or Advanced Glassfiber Yarns LLC and R-glass is available from Saint-Gobain Vetrotex.

While the addition of fibers may improve the resistance to friction and wear of the fluoropolymer compositions, it has been found that the microspheres provided herein may provide similar properties than fibers. Therefore, the addition of fibers may not be necessary to improve resistance to wear. In some embodiments of the present disclosure the fluoropolymer compositions are free of fibers or contain fibers in an amount of less than 15% by weight of the total composition, preferably less than 5% and more preferably no or less than 1.0 by weight, based on the total weight of the composition of fibers.

The fluoropolymer compositions according to the present disclosure may also include additional materials in varying concentrations if desired to further improve some properties of the compositions. Suitable additives include for example pigments or dyes, antioxidants, UV stabilizing agents, fillers (organic and inorganic) other than the microspheres and fibers described above, and combinations thereof. Other additives are processing aids, for example small amounts of mineral oils, vegetable waxes which facilitate demolding of the fluoropolymer compounds.

A typical example of a filler commonly used in fluoropolymer compositions includes carbon particles such as for example graphite or carbon blacks. Carbon particles also provide black colour to the fluoropolymer compositions. The fluoropolymer compositions may typically comprise from about 1 to about 15% by weight based on the total fluoropolymer composition of carbon particles.

Method of Making Fluoropolymer Articles

The fluoropolymer compositions according to the present disclosure may be made by blending or mixing the ingredients using blending and mixing techniques and equipment as known in the art of fluoropolymer compounding. After blending or mixing, the compositions may be further processed and shaped to form articles. Form-giving methods as known in the art may be used and include, for example but not limited thereto, compression molding, cutting and sintering and subsequent machining (e.g., skiving). An example of a suitable compression molding process includes compacting the compositions into preformed dimensions with a compression mold, such as a hydraulic press. Suitable pressures for compression molding range from about 13.8 MPa (2.000 psi)) to about 82.7 MPa (12.000 psi). The compression pressure may be applied in one direction (i.e., automatic compression molding) or from all sides (i.e., isostatic compression molding).

The compacted composition may then be sintered by applying heat to consolidate the composition at a temperature above the crystalline melting point (initial melting point) of the fluoropolymer. Examples of suitable sintering conditions include heating the compacted composition at a temperature of between 340° C. and 380° C., for example at about 365° C. Sintering of the composition may be carried out in the compression mold. Alternatively, the compositions may also be removed from the compression mold and placed in a sintering oven when subjected to the sintering step.

Compression molding followed by sintering may be used to form the final article, or may be used to form intermediary articles that undergo subsequent machining Examples of intermediary articles that may be formed include spheres, sheets and billets (i.e., cylinders) that may be subsequently skived (i.e., sliced and peeled) to form differently shaped articles, like O-rings, films and sheets.

The fluoropolymer compositions according to the present disclosure may be used to form articles that are dimensionally stable and exhibit good compressive strengths by withstanding high levels of compressive forces as indicated, for example, by low deformation. The fluoropolymer compositions provided herein also exhibit good tensile strengths to prevent or reduce tearing and puncturing. The fluoropolymer compositions provided herein also have an increased wear resistance. This makes the fluoropolymer compositions particularly suitable as material for making gaskets or seals or components thereof. Such gaskets or seals may be advantageously used in dynamic or static applications, i.e. as dynamic or static gaskets or seals. Dynamic seals or gaskets seal the junction between two or more surfaces (typically metal surfaces or plastic surfaces having similar mechanical rigidity than metals) of which at least one may be moving when used. The moving surface may exert frictional or other physical forces on the seal or gasket. Static seals or gaskets seal a junction between two or more surface which are not moving when in use. The fluoropolymer compositions are also resistant to hydrocarbon fumes and liquids, e.g. resistant to fuels for combustion engines or hydrocarbon-based lubricants.

Therefore, the fluoropolymer compositions may form or may be part of an article (e.g. a seal) used in engine driven applications, like for example a motor vehicle. The fluoropolymer compositions may be particularly useful in the manufacture of crankshafts, crankshaft seals, camshafts, camshaft seals, pistons, piston seals, cylinder receiving pistons including seals for such cylinders, bearings and housing for bearings and including seals for such housing. The fluoropolymer compositions may form the entire article or may be present as a component of the article.

The fluoropolymer compositions provided herein are typically fluoropolymer compounds, i.e. solid compositions. The fluoropolymer compounds typically do not melt or disintegrate at a temperature below 200° C. at ambient pressure (i.e. 1 bar). The fluoropolymer compositions or compounds provided herein typically have one or more or all of the following properties:
(i) an elongation at break of at least 250%, preferably at least 350% or even at least 400% (ASTM D 4755-06), for example between 250 and 550%;
(ii) a tensile strength of at least 10 MPa, preferably at least 12 MPa, for example between 15 and 25 MPa;
(iii) a shore D hardness of at least 50, preferably at least 60, for example between 62 and 71;
(iv) a permanent deformation of less than 3.5%, for example between 2.0 and 3.3%
(v) a wear factor of less than $3*10^{-6}$ mm$^3$/Nm, preferably less than $1.0 \times 10^{-7}$ mm$^3$/Nm.

In some embodiments of the present disclosure the compositions provided herein have an elongation at break of more than 300%, a tensile strength of at least 15 MPa, a permanent deformation of less than 3% and a wear factor of less than $1.0*10^{-7}$ mm$^3$/Nm.

EXAMPLES

The following examples are provided to further illustrate the compositions and methods provided herein. These examples are provided to illustrate certain embodiments but are not meant to limit the invention thereto. Prior to that some test methods used to characterize materials and their properties will be described. Unless specified otherwise, percentages are percentages by weight with respect to the mass of the total compositions and add up in each case to 100 weight percent.
Test Methods
Hardness:
  Hardness Shore D was measured according to DIN-53505. The results listed are the average values of 3 measurements.
Tensile Strength at Break, Elongation at Break:
  These properties were determined using an INSTRON tester with a 0.5 KN load cell in accordance with ASTM D 4745-06. All tests were run at a constant cross head displacement rate of 50 mm/min. Each test was run 4 times. The values reported are averages of the 4 tests. Elongation at Break is reported in %. Tensile Strength at Break is reported in units of Mega Pascals (MPa).
Deformation:
  The deformation at room temperature was measured after 24 hrs, after 100 hours and after 124 hours (permanent deformation) according to ASTM D 621. The values reported are the averages of 3 samples and the values recorded are %.
Wear Factor and Friction Coefficient
  The wear factor and friction coefficient were determined according to ASTM 3702: "Wear Rate and Coefficient of Friction in Self-Lubricated Rubbing Contact" using a Thrust Washer Machine. This test was done using a Lewis Wear Tester (Lewis Research Inc.), by holding a sample having a contact surface of 134.6 mm$^2$ against a 1018 stainless steel trust washer with a surface finish of 0.4μ at a constant contact pressure (0.69 MPa) and at a constant sliding speed (0.51 m/s) during 100 hours to measure both the dynamic coefficient of friction and the wear properties of the sample. The wear factor is expressed in mm$^3$/Nm. The lower the value the greater is the resistance of the material to wear.
Melting Point:
  Melting points can be determined by DSC (a Perkin Elmer differential scanning calorimeter Pyris 1) according to ASTM D 4591. 5 mg samples are heated at a controlled rate of 10° C./min to a temperature of 380° C. by which the first melting temperature is recorded. The samples are then cooled at a rate of 10° C./min to a temperature below the first melting temperature was observed, typically to a temperature of 300° C., and then reheated at 10° C./min to a temperature at 380° C. The melting point observed at the second heating period is recorded and is referred to herein as the melting point of the polymer (melting point of the once molten material). Polymers with a very high content of TFE-units tend to have different melting points when being molten for the first time and after being molten for the first time, in which case the melting point tends to be somewhat lower. However, once the material has been molten for the first time the melting point remains constant. When referred herein to a melting point the melting point of the once molten material is meant unless stated otherwise.
Melt Flow Index (MFI):
  Melt flow index can be measured with a Göttfert melt indexer according to DIN EN ISO 1133 using a 5 kg load and a temperature of 372° C. (MFI 372/5). The extrusion time is one hour.
Materials Used and Abbreviations:
  PTFE TFM 1700: granular PTFE (obtained by suspension polymerisation), having an average particle size of 25 μm, commercially available from 3M; St. Paul, Minn., U.S.A.
  W610: ceramic microspheres, average particle size 10 μm (volume average), density 2.5 g/cm$^3$, commercially available from 3M, St. Paul, Minn., U.S.A.
  E glass fiber (GF): low alkali glass (length 35 micron, diameter 13 micron) commercially available from Owens Corning Toledo, Ohio, U.S.A.

EXAMPLES

Examples 1 and Comparative Example C-1

Examples 1 and comparative examples C-1 were made by blending the fluoropolymer with the inorganic microspheres (MS) in the amounts as indicated in table 1 by using a Lödige high speed mixer (Gebrüder Lödige Maschinenbau GmbH, Paderborn, Germany). The blends were compression moulded at 40 Mpa into billets with a diameter of 45 mm and 60 mm height and then slowly degassed. The obtained materials were sintered at 356° C. for 12 hours. The samples were then tested for their properties as given in table 1.

TABLE 1

| Properties of PTFE compositions | | |
|---|---|---|
| | Example 1 PTFE + 10% wt. MS | C1 PTFE + 25% wt GF |
| Tensile strength at break (MPa) | 19.5 | 18.5 |
| Elongation at break (%) | 370 | 360 |
| Hardness (Shore D) | 69 | 69 |
| Helium permeation cm$^3$ * mm/d * m$^2$ * bar | 4260 | 177700 |
| Wear factor (mm$^3$/Nm) | 2.4E−07 | 2.6E−07 |
| Friction coefficient | 0.24 | 0.29 | amounts are % by weight based on total weight of composition with the ingredients above making up 100%.

Example 1 and Comparative Example C1 show that for reaching comparative wear factor and friction coefficients much more glass fibers have to be used than microspheres. The material according to the present disclosure can be much easier processed and shaped into seals. A comparison of example 1 and comparative example C1 also show that compounds according to the present disclosure have a significantly improved resistance to hydrocarbons as is indicated by the Helium permeation test. The greater the Helium permeation the more penetrable the material is for gases and hydrocarbon fumes.

Comparative Example 2

A PTFE sample without addition of inorganic particles or fibers was subjected to the wear test. The experiments had to be stopped because the high wear alarm was triggered already after 0.8 hours.

List of Embodiments

The following list of embodiment is provided to further illustrate some particular embodiments according to the present disclosure. This list is provided for illustrative purposes only and not meant to limit the disclosure to the specific embodiments contained in this list.
1. A composition comprising
  (i) tetrafluoroethene polymer selected from tetrafluoroethene homopolymers and tetrafluoroethene copolymers containing up to about 20% by weight of comonomers other than tetrafluoroethene;
  (ii) microspheres having a density of from about 1.2 to about 3.0 g/cm$^3$ and comprising inorganic oxides selected from aluminium oxides, silicon oxides and combinations thereof.
2. The composition according to embodiment 1 wherein the tetrafluoroethene polymer has a melt flow index at 372° C. and 5 kg load (MIF 372/5) of less than 10 g/10 min.
3. A composition comprising
  (i) tetrafluoroethene polymer selected from tetrafluoroethene homopolymers and tetrafluoroethene copolymers containing up to about 10% by weight of comonomers other than tetrafluoroethene;
  (ii) microspheres having a density of from about 1.2 to about 3.0 g/cm$^3$ and comprising inorganic oxides selected from aluminium oxides, silicon oxides and combinations thereof.
4. A composition comprising
  (i) tetrafluoroethene polymer selected from tetrafluoroethene homopolymers and tetrafluoroethene copolymers containing up to about 1% by weight of comonomers other than tetrafluoroethene;
  (ii) microspheres having a density of from about 1.2 to about 3.0 g/cm$^3$ and comprising inorganic oxides selected from aluminium oxides, silicon oxides and combinations thereof.
5. The composition according to embodiment 4 wherein the tetrafluoroethene polymer has a melt flow index at 372° C. and 5 kg load (MIF 372/5) of less than 0.1 g/10 min.
6. The composition according to any one of the preceding embodiments wherein the tetrafluoroethene polymer has a melting point of 327° C.+/−10° C.
7. The composition according to any one of the preceding embodiments wherein the tetrafluoroethene polymer is obtained by suspension polymerisation.
8. The composition according to any one of the preceding embodiments wherein the tetrafluoroethene polymer is obtained by emulsion polymerisation.
9. The composition according to any one of the preceding embodiments having an elongation at break of at least 250, preferably at least 350% or even at least 400%, for example between 250 and 550%.
10. The composition according to any one of the preceding embodiments having a tensile strength at break of at least 10 Mpa, preferably at least 12 MPa, for example between 15 and 25 MPa.
11. The composition according to any one of the preceding embodiments having a wear coefficient of less than $3\times10^{-7}$ mm$^3$/Nm.
12. The composition according to any one of the preceding embodiments wherein the microspheres are solid.
13. The composition according to any one of the preceding embodiments wherein the microspheres are glass particles.
14. The composition according to any one of embodiments 1 to 12 wherein the microspheres are ceramic microspheres.
15. The compositions according to any one of the preceding embodiments wherein the microspheres have a volume average particle size (diameter) between about 1 µm and about 50 µm.
16. The compositions according to any one of the preceding embodiments wherein the microspheres have a volume average particle size (diameter) between about 1 µm and about 15 µm.
17. The composition according to any one of the preceding embodiments being a PTFE compound.
18. The composition according to any one of the preceding embodiments being obtainable by the method according to any one of embodiments 27 to 29.
19. The composition according to any one of the preceding embodiments containing from about 1.5 to about 30% by weight of the microspheres based on the total weight of the composition.
20. The composition according to any one of the preceding embodiments containing from about 1 to 10% by weight of carbon particles based on the total weight of the composition.
21. The composition according to any one of the preceding embodiments wherein the microspheres have a bulk density of from about 1.2 to about 2.2 g/cm$^3$.
22. A shaped article comprising the composition according to any one of the preceding embodiments.
23. The article of embodiment 22 being a dynamic seal.
24. The article of embodiment 22 being a static seal.
25. The article of embodiment 22 being a component of a motor vehicle.
26. The article of embodiment 22 being selected from crank shaft seals and cam shaft seals.
27. A method of making a composition according to any one of embodiments 1 to 21 comprising combining
  (i) the tetrafluoroethene polymer,
  (ii) the microspheres containing inorganic oxides selected from silica and alumina and combinations thereof;
  and, optionally, subjecting them to temperature and/or pressure treatment to form a shaped composition, optionally followed by sintering.
28. The method according to embodiment 27 wherein the tetrafluoroethene polymer is in particulate form in the shape of particles having a length or a diameter of from about 5 to 800 µm.
29. The method of embodiments 27 to 28 wherein the composition is shaped by compression molding, ram extrusion or cutting after sintering.

The invention claimed is:
1. An o-ring seal made from a composition comprising
  (i) a tetrafluoroethylene polymer selected from tetrafluoroethylene homopolymers and tetrafluoroethylene copolymers containing up to about 20% by weight of comonomers other than tetrafluoroethylene;

(ii) microspheres having a bulk density of from about 1.2 to about 3.0 g/cm$^3$ and comprising inorganic oxides selected from aluminium oxides, silicon oxides and combinations thereof, wherein the microspheres have a volume average diameter of from about 0.5 to about 50 μm.

2. The o-ring seal according to claim 1 wherein the tetrafluoroethylene polymer has a melt flow index at 372° C. and 5 kg load (MIF 372/5) of less than 0.1 g/10 min.

3. The o-ring seal according to claim 1 wherein the tetrafluoroethylene polymer has a melting point of 317° C.+/−20° C.

4. The o-ring seal according to claim 1 having an elongation at break of at least 250% and/or a tensile strength at break of at least 10 Mpa.

5. The o-ring seal according to claim 1 having a wear coefficient of less than 3×10$^{-7}$ mm$^3$/Nm.

6. The o-ring seal according to claim 1 wherein the microspheres are not hollow.

7. The o-ring seal according to claim 1 wherein the microspheres are ceramic particles.

8. The o-ring seal according to claim 1 being a solid composition shaped into particles.

9. The o-ring seal according to claim 1 wherein the microspheres have a bulk density of from about 1.2 to about 2.2 g/cm$^3$.

10. The o-ring seal according to claim 1 being a camshaft seal or a crankshaft seal.

* * * * *